(12) United States Patent
Osterfeld (10) Patent No.: US 9,376,082 B2
(45) Date of Patent: Jun. 28, 2016

(54) AIRBAG MODULE AND MODULE HOUSING

(71) Applicant: TK Holdings Inc., Auburn Hills, MI (US)

(72) Inventor: Douglas L. Osterfeld, Waterford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/336,544

(22) Filed: Jul. 21, 2014

(65) Prior Publication Data

US 2015/0021886 A1 Jan. 22, 2015

Related U.S. Application Data

(60) Provisional application No. 61/856,611, filed on Jul. 19, 2013.

(51) Int. Cl.
*B60R 21/217* (2011.01)
*B60R 21/201* (2011.01)
*B60R 21/2165* (2011.01)

(52) U.S. Cl.
CPC .......... *B60R 21/2176* (2013.01); *B60R 21/201* (2013.01); *B60R 21/2165* (2013.01); *B60R 21/2171* (2013.01)

(58) Field of Classification Search
CPC ............ B60R 21/2171; B60R 21/2176; B60R 21/217; B60R 21/215; B60R 21/216; B60R 21/20
USPC ..................... 280/728.2, 732, 728.1
See application file for complete search history.

(56) References Cited

U.S. PATENT DOCUMENTS

| | | | |
|---|---|---|---|
| 5,647,608 A | 7/1997 | Damman et al. | |
| 5,669,627 A | 9/1997 | Marjanski et al. | |
| 2002/0175443 A1 | 11/2002 | Visconti et al. | |
| 2007/0188007 A1* | 8/2007 | Lazanja et al. | 297/452.42 |
| 2008/0048418 A1* | 2/2008 | Remley et al. | 280/728.2 |
| 2011/0148077 A1 | 6/2011 | Enders | |

* cited by examiner

*Primary Examiner* — Keith Frisby
(74) *Attorney, Agent, or Firm* — L.C. Begin & Associates, PLLC (57) ABSTRACT

A housing for an airbag module includes an extrusion incorporating a body portion and a cover extruded integrally with the body portion so as to form a single monolithic unit. At least one endcap formed separately from the extrusion is operatively coupled to an end of the extrusion so as to seal the end.

14 Claims, 7 Drawing Sheets

AIRBAG MODULE AND MODULE HOUSING

CROSS-REFERENCE TO RELATED APPLICATIONS

This application claims the benefit of U.S. Provisional Application Ser. No. 61/856,611, filed on Jul. 19, 2013, the disclosure of which is incorporated herein by reference in its entirety.

BACKGROUND

This application relates generally to the field of driver and passenger protection devices in automobiles.

Airbag modules may be mounted in an interior of a vehicle. The airbag module generally includes a housing containing an airbag structured to deploy to cushion body portions of a vehicle occupant, in the event of a vehicle collision. Generally, the housing provides a mounting structure for securing the module components with respect to each other and for mounting the module components to the vehicle. The housing may need to reliably secure the airbag therein prior to airbag deployment. The housing also needs to reliably open so as to release the airbag during deployment.

Previously, module housings have been produced by such processes as injection molding and stamping. However, these processes may generate excessive scrap. Also, the requirements of processing the housing materials may necessitate thicker cross-sections than would otherwise be necessary, thereby increasing part weight and cost.

In addition, the housing generally includes a body and a cover applied to the body to retain the module components within the housing for installation in the vehicle and until airbag deployment. In fabricating the housing using injection molding and stamping processes, it has been necessary to form the cover separate from the body. This increases tooling, manufacturing and inventory costs and may also complicate module assembly.

In view of the above, an ongoing need exists for improved module and housing structures that meet manufacturing and operational requirements.

SUMMARY OF THE INVENTION

In one aspect of the embodiments described herein, a housing for an airbag module is provided. The housing includes an extrusion incorporating a body portion and a cover extruded integrally with the body portion so as to form a single monolithic unit, and at least one endcap formed separately from the extrusion and operatively coupled to an end of the extrusion so as to seal the end.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Figure 1:
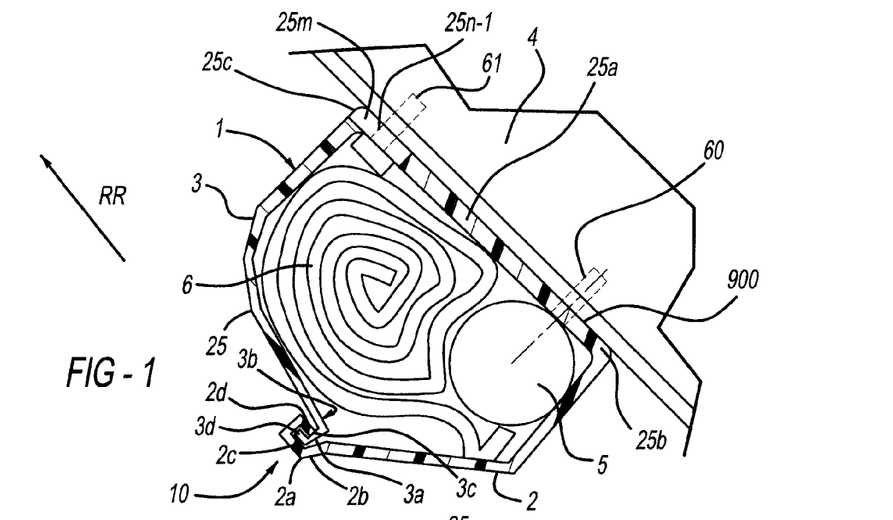
FIG. 1 is a cross-sectional side view of one embodiment of an airbag module attached to a portion of a vehicle interior, and showing one embodiment of a disengageable connecting means for connecting portions of the housing prior to airbag deployment.

Embodiments will be described with reference to the accompanying drawings. FIG. 1 shows a portion of a vehicle located in the occupant compartment of the vehicle, including an airbag module 1. The airbag module 1 includes an inflator 5, an airbag 6, and a module housing 25. A body portion 25a of the housing 25 is mounted to a suitably located panel 4 or other portion of the vehicle interior using suitable mounting hardware.

In the embodiments described herein, housing 25 is formed using an extrusion process. This type of process is known in the art. Depending on the requirements of a particular design, secondary operations (such as die cutting, for example) may be performed on the housing after extrusion.

Also, in the embodiments described herein, housing 25 has body portion 25a and a cover (generally designated 10) extruded integrally with the body portion 25a so as to form a single monolithic unit. As used herein, the term "monolithic" means that the housing is extruded as a single piece. Thus, in the embodiments shown, body portion 25a, first portion 2 and second portion 3 as described below are formed as a single, unitary piece.

Figure 9:
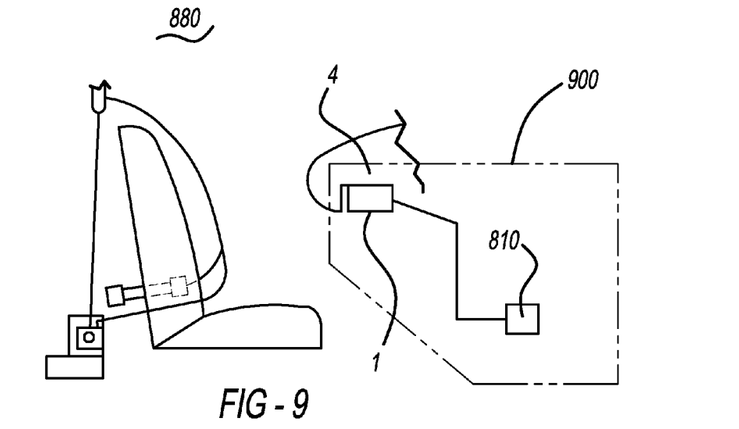
FIG. 9 is a schematic view of a portion of a vehicle occupant protection system installed in a vehicle and incorporating an airbag module 1 in accordance with an embodiment described herein.

In the embodiments shown in FIGS. 1-6, cover 10 includes a first portion 2 extending from a first edge 25b of the body portion, and a second portion 3 extending from a second edge 25c of the body portion opposite the first edge. In FIG. 1, body portion 25a is planar and is structured for mounting to a mounting surface 900 of the panel 4 such that the body portion extends along and contacts the mounting surface. In FIG. 1, the mounting surface 900 to which the body portion 25a is secured is shown residing at an angle with respect to the horizontal. However, the body portion may be secured to a horizontal mounting surface (such as shown in FIG. 9), a vertical mounting surface, or a mounting surface oriented at any angle needed to achieve a desired airbag deployment direction, depending on the requirements of a particular application.

In particular embodiments, the housing is extruded from a polymeric material. Polymers suitable for use in the housing embodiments described herein will generally have superior low-temperature flexural properties. One example of a polymer suitable for use in the housing embodiments described herein is Adflex KSO21P Polyolefin from LyondellBassell Industries. One suitable source for this material is Gemini Plastics located in Ubly, Mich. However, any of the housing portions 25a, 2 and 3 may be formed from any material suitable for the purposes described herein.

Figure 6:
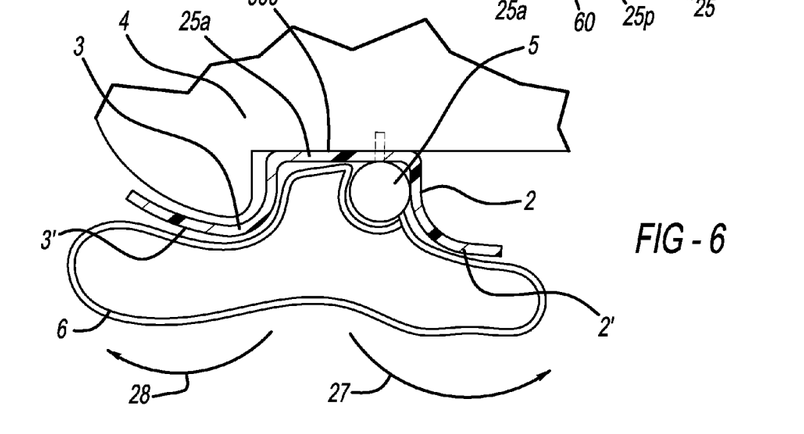
FIG. 6 is a cross-sectional side view of the airbag module shown in FIG. 1 during deployment of the airbag.

In one embodiment, at least the one of housing portions 2 and 3 positioned farthest from the inflator 5 (for example, housing second portion 3 in the embodiment shown in FIG. 6) is also structured to resiliently bend downwardly and outwardly as shown in FIG. 6, responsive to forces exerted by an inflating airbag positioned in the housing. This resiliently bendable portion of the housing thereby acts as a ramp to guide the airbag from a stored position into the occupant compartment. In particular embodiments, housing second portion 3 bends in the direction indicated by arrow RR (towards the rear of the vehicle, as shown in FIG. 1) during airbag deployment. The size or surface area of housing portion 3 acting as a ramp may be adjusted to the particular vehicle application by adjusting the location of the seam formed by the connection between the edges of housing portions 2 and 3. In the particular embodiment shown in FIGS. 1-6, both of housing portions 2 and 3 act as ramps during airbag deployment, in the manner described below.

Figure 4:
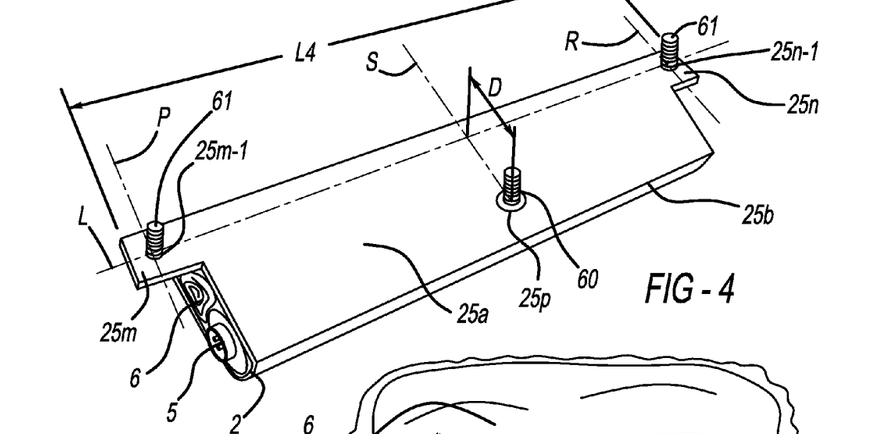
FIG. 4 is a perspective view of the airbag module shown in FIG. 1 showing a portion of the module used for mounting to a vehicle.
Figure 5:
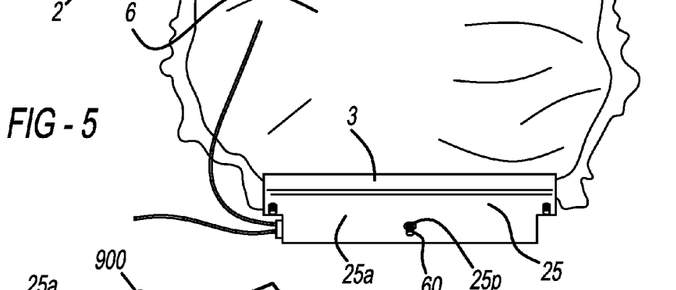
FIG. 5 is a plan view of the airbag module shown in FIG. 1 after deployment of an airbag contained in the module.
Figure 11:
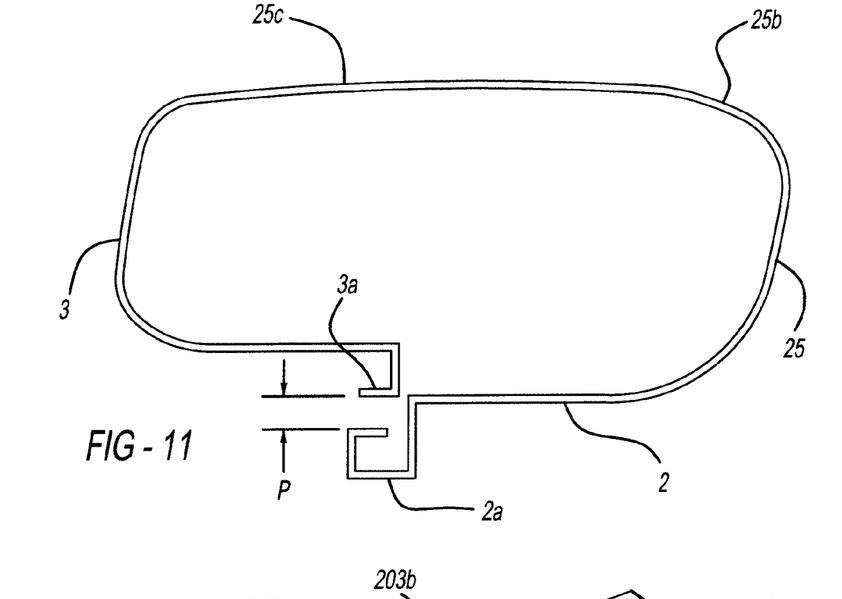
FIG. 11 is an end view of an alternative extruded shape from which an embodiment of the airbag module housing may be formed.

In one embodiment, the housing is extruded in the desired folded or final configuration, but with the free edges of first and second housing portions 2 and 3 separated. In another embodiment, the housing is extruded in the folded configuration shown in FIG. 11, with the extrusion direction extending along an axis pointing into and out of the drawing, and the free edges of first and second housing portions 2 and 3 separated a distance P. In the example shown in FIG. 11, the free edges of first and second housing portions 2 and 3 incorporate respective hook portions 2a and 3a as described in greater detail below. For example, the housing 25 may be extruded in the form shown in FIG. 2, but with the housing portion free edges separated. If desired, any disengageable connecting means to be incorporated into the housing may also be extruded integrally with (and during the same process as) the remainder of the housing. If it is desired to provide additional features such as mounting members 25m and 25n (as shown in FIG. 4 and described herein), die-cutting or other suitable post-extrusion operations may be performed on the extruded housing.

In the embodiments described herein, disengageable connecting means are provided for connecting the first portion 2 and the second portion 3 along a seam formed therebetween. The connecting means maintains the connection between the first and second portions 2 and 3 prior to activation of the airbag module and inflation of the airbag. This keeps the folded airbag 6 contained within the module housing 25 prior to module activation. The connecting means is also disengageable responsive to forces exerted by the airbag on the housing portions 2 and 3 during inflation or expansion of the airbag, to release the expanding airbag from the housing. In particular embodiments, the disengageable connecting means are extruded integrally with (and during the same process as) the remainder of the housing.

Referring to FIG. 1, in one embodiment, the first portion 2 and the second portion 3 are joinable or connectable at a seam formed therebetween by any suitable mechanism. For example, the first portion 2 and the second portion 3 may each include a latching or clasping mechanism such as, for example, the curved, interengaging hook portions 2a and 3a shown in FIG. 1 which are configured to clasp together after the folded airbag has been positioned in housing 25. The curved, interengaging hook portions 2a and 3a shown in FIG. 1 may be extruded into and along with the remainder of the housing, as previously described. In the embodiment shown in FIGS. 1 and 3, a hook portion 2a is formed along an edge 2b of first portion 2 and defines a cavity 2c structured for receiving therein a complementary end 3d of a hook portion 3a formed along an edge 3b of second portion 3. Hook portion 2a terminates in an end 2d structured to be insertable inside a cavity 3c formed in a hook portion 3a of housing second portion 3.

Figures 2, 3:
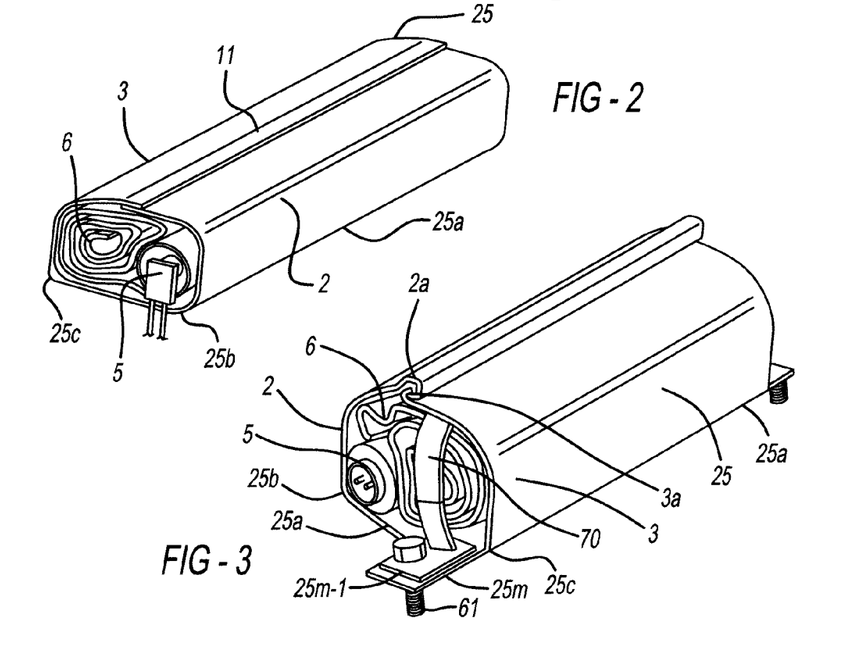
FIG. 2 is a perspective view of another embodiment of an airbag module.
FIG. 3 is a perspective view of a portion of the airbag module shown in FIG. 1, shown detached from the vehicle.

As described above, hook portion 3a is formed along an edge 3b of second portion 3 and defines cavity 3c structured for receiving therein a complementary end 2d of hook portion 2a formed along edge 2b of first portion 2. Hook portion 3a terminates in an end 3d structured to be insertable inside cavity 2c formed in a hook portion 2a of housing first portion 2. The folded airbag is positioned within the housing 25 and first and second housing portions 2 and 3 folded over the airbag to enclose the airbag. Housing portions 2 and 3 will contact the airbag and further compress the airbag in the housing as the portions of the clasping mechanism are engaged with each other. The folded airbag will tend to resist further compression by the first and second housing portions 2 and 3 and will exert counter forces on the housing portions resisting engagement of the clasping mechanism components.

Hook portion 2a is structured to enclose the end 3d received therein such that a force exerted by the airbag on housing second portion 3 tends to force hook end 3d deeper into cavity 2c or otherwise into tighter engagement with hook portion 2a. Similarly, hook portion 3a is structured to enclose the end 2d received therein such that a force exerted by the airbag on housing second portion 2 tends to force hook end 2d deeper into cavity 3c or otherwise into tighter engagement with hook portion 3a. Thus, the forces exerted by the compressed airbag on the first and second housing portions 2 and 3 and on the particular clasping mechanism structure shown in FIGS. 1 and 3 aid in securing ends of the housing first and second portions 2 and 3 together prior to airbag deployment.

The clasping mechanism just described is also structured to release or disengage during deployment of the airbag 6 and responsive to the onset of airbag deployment. In this embodiment, the clasping mechanism elements are structured to have sufficient stiffness to maintain the locking engagement shown in FIG. 1 and previously described. The clasping mechanism elements are also structured to have sufficient flexibility to deform (if necessary) under loading from the expanding airbag, such that hook end 3*d* disengages from hook portion 2*a* and hook end 2*d* disengages from hook portion 3*a* when the airbag starts to inflate.

Figure 10:
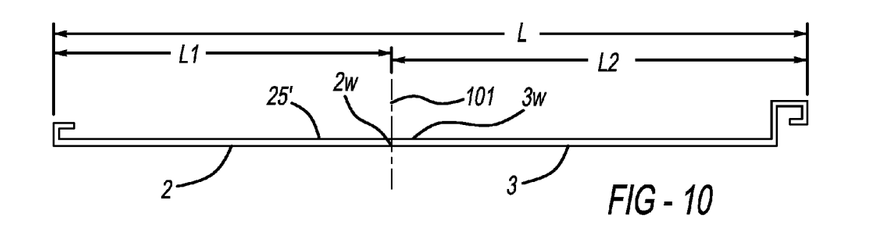
FIG. 10 is an end view of an extruded shape from which an embodiment of the airbag module housing may be formed.
Figure 10A:
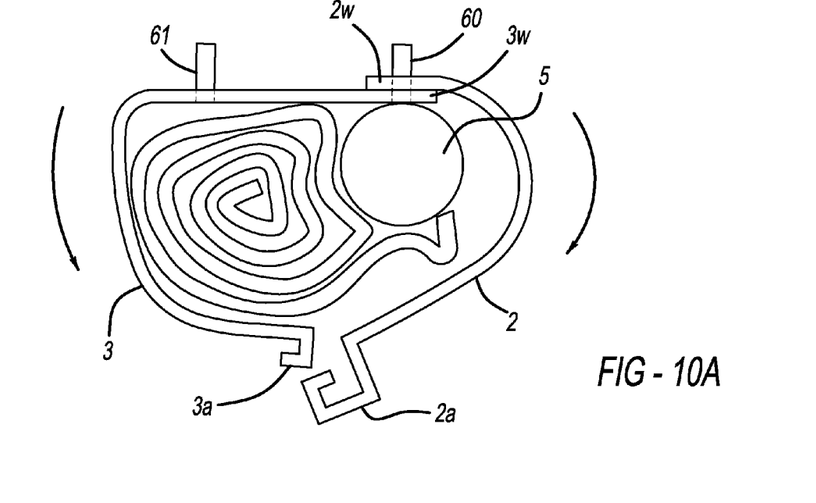
FIG. 10A is a schematic end view of an airbag module fabricated using the housing embodiment shown in FIG. 10.

FIGS. 10 and 10A illustrate a particular embodiment of a method for fabricating a module housing. FIG. 10 is an end view of an extrusion from which an embodiment of the airbag module housing may be formed, with the extrusion direction extending along an axis pointing into and out of the drawing. FIG. 10A is a schematic end view of an airbag module fabricated using the housing embodiment shown in FIG. 10. In FIGS. 10 and 10A, the housing portions have free edges incorporating disengageable connecting means as shown in FIGS. 1 and 3. However, the disengageable connecting means formed along the housing portion edges may have any suitable alternative configuration.

In FIG. 10, a housing blank 25' is extruded from a die along an axis extending perpendicular to the plane of the drawing. After extrusion, blank 25' may be cut along a cut line 101 located so as to provide a desired length L1 of first housing portion 2, and a desired length L2 of second housing portion 3 (where lengths L1 and L2 extend along the plane of the drawing page). First housing portion 2 then terminates in a free edge 2*w*, and second housing portion 3 terminates in a free edge 3*w*. The lengths of the housing portions 2 and 3 are determined by the desired location of the connecting seam between the disengageable connecting means, the particular dimensions of the disengageable connecting features used to connecting the housing portions, and other pertinent factors. In a particular embodiment, the cut line for the free edge 2*w* of first housing portion 2 is spaced apart from the cut line for the free edge 3*w* of second housing portion 3. Thus, the portion of the housing blank between these cut lines is unused in the final housing. This allows greater flexibility in fabricating any of a variety of lengths of the first and second housing portions from a single housing blank.

Referring to FIG. 10A, after the blank 25' has been cut, edges 2*w* and 3*w* may be overlapped and secured together (for example, using fasteners 61 or any other suitable means). The edges of the housing portions incorporating the disengageable connecting means are then mated as described elsewhere herein, after insertion of the module components and folding of the housing portions 2 and 3. The ability to cut each of housing portions 2 and 3 to a desired length allows the location of the connecting seam to be varied along the housing exterior surface, according to the requirements of a particular application. In addition, housings of various sizes can be fabricated from a blank 25' of a single overall length L.

Figures 2A, 7:
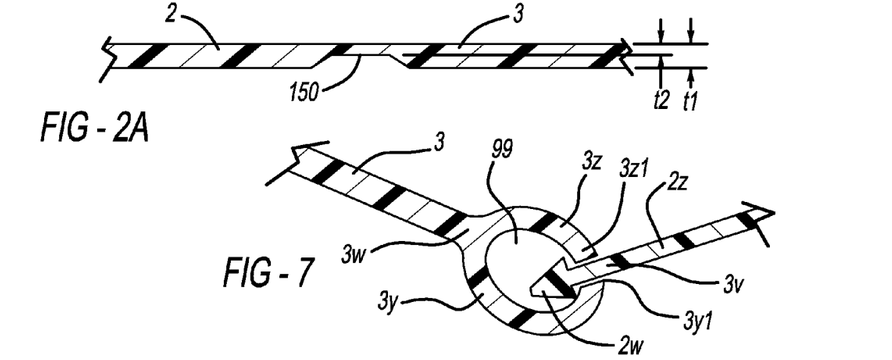
FIG. 2A is a cross-sectional view of a portion of an airbag module housing showing an alternative embodiment of a disengageable connecting means for connecting portions of the housing prior to airbag deployment.
FIG. 7 is a cross-sectional view of a portion of an airbag module housing showing an alternative embodiment of a disengageable connecting means for connecting portions of the housing prior to airbag deployment.

FIG. 7 is a cross-sectional view of a portion of an airbag module housing showing an alternative embodiment of a disengageable connecting means for connecting portions of the housing prior to airbag deployment. Referring to FIG. 7, in an alternative embodiment, housing second portion 3 is formed such that a pair of opposed, resiliently deflectable wall portions 3*y* and 3*z* extend from and along a free edge 3*w* of the second housing portion 3. Walls 3*y* and 3*z* define a cavity 99 therebetween. Walls 3*y* and 3*z* extend along all or at least a portion of the housing portion edge 3*w* and terminate in free ends 3*z*1 and 3*y*1 which define a gap 3*v* therebetween. In addition, a free edge 2*w* of first housing portion 2 is formed into a tapered, "arrowhead" configuration structured for insertion into the gap 3*v*. As the edge 2*w* is wedged into gap 3*v* and into the cavity 99, wall portions 3*y* and 3*z* deflect and snap back behind edge 2*w* to help retain the edge 2*w* within the cavity 99. At some point during airbag inflation, the airbag exerts sufficient force on the separating housing portions 2 and 3 to produce extraction of edge 2*w* from cavity 99. The elements of the alternative disengageable connecting means just described 1 may be extruded into and along with the remainder of the housing, as previously described.

In particular embodiments, first portion 2 and second portion 3 are formed as a single, unitary piece connected at a seam 98 formed therebetween. The disengageable connecting means is in the form of a weakened section 11 which may be extruded or otherwise formed along the seam. The weakened section 11 is structured to fracture or tear responsive to expansion of the airbag, thereby enabling the deployed airbag to contact and protect an occupant of the vehicle.

Figure 8:
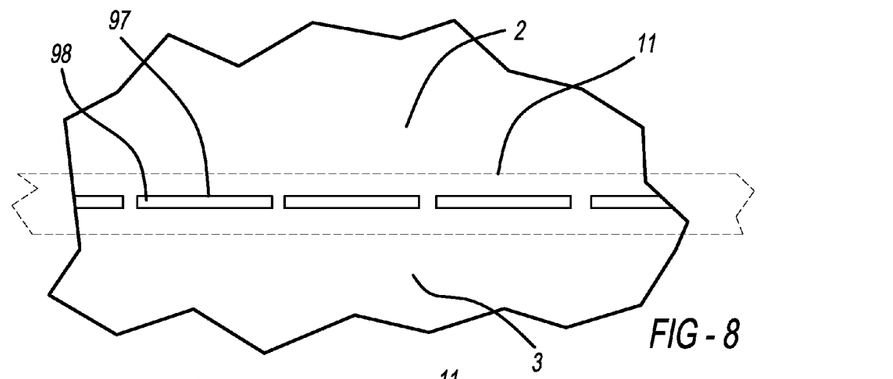
FIG. 8 is a plan view of a portion of an airbag module housing showing another alternative embodiment of a disengageable connecting means for connecting portions of the housing prior to airbag deployment.

For example, referring to FIG. 8, perforations 97 may be cut along the seam between first portion 2 and second portion 3 after extrusion. The housing material tears along a longitudinal axis of the perforations, thereby opening the housing.

Referring to FIG. 2A, in an alternative embodiment, a weakened portion 150 in the form of a "tear seam" is extruded into the housing during housing formation, at a location where it is desired to form a seam between first and second portions 2 and 3. A relatively thinner wall section t2 is extruded adjacent (and connecting) first and second housing portions 2 and 3, each having a relatively greater wall thickness of t1. The weakened portion 150 is structured to serve as a stress concentration during airbag deployment, so that the housing fractures along the relatively thinner wall section t2 during airbag deployment.

In embodiments such as shown in FIGS. 8 and 2, the respective lengths of first and second portions 2 and 3 may be controlled by adjusting the locations of the housing seam or weakened section formed in the during housing fabrication.

Figure 8A:
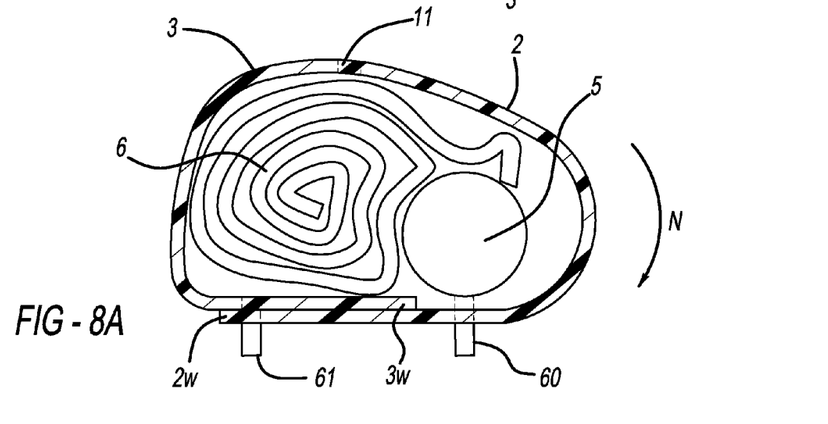
FIG. 8A is a schematic end view of an airbag module fabricated using the housing embodiment shown in FIG. 8.

Referring to FIG. 8A, in one method of assembling an airbag module having a housing with a weakened section, a sheet of flexible housing material is cut to or formed in a predetermined length so as to position the weakened portion 11 at a desired location along an exterior surface of the housing. Ends 2*w* and 3*w* of housing portions 2 and 3 may then be overlapped and secured with respect to each other using, for example, bolts or screws (such as bolts 61) used to attach the module to the vehicle, or using another suitable method.

According to yet another embodiment, the first portion 2 and the second portion 3 may be connected by a clasping mechanism where one or both portions include an adhesive. In this embodiment, the clasping structures previously described may be omitted from the edges of housing portions 2 and 3, if desired.

In yet another embodiment, the first and second portions may be connected using a hook and loop type fastener.

Before deployment of the airbag 6, the disengageable connecting means keeps the first portion 2 and the second portion 3 connected to each other. During a vehicle collision, the airbag 6 deploys, thereby causing the first portion 2 and the second portion 3 to unclasp, unfasten or otherwise separate.

Alternative latching or securement mechanisms for securing the ends of first and second housing portions 2 and 3 in a closed or latched condition are also contemplated, including mechanisms that remain engaged when no expansion forces are exerted on the by the compressed airbag on housing portions 2 and 3 and/or on the particular securement mechanism. These mechanisms are also structured to release or disengage during deployment of the airbag 6, and responsive to the onset of airbag deployment.

In the embodiment shown in FIGS. 1 and 3, housing 25 also includes at least a pair of mounting members 25m and 25n extending from opposite ends of the body portion 25a. In the embodiment shown, each mounting member is located at an intersection of the body portion 25a with housing second portion 3. In addition, each mounting member extends along only a portion of a respective end of the body portion 25a. Alternatively, one or more mounting members may extend along an entire length or extent of a respective body portion end. In other embodiments, the mounting members may be omitted and the housing may be attached to the vehicle along one or more of body portion 25a and first and/or second housing portions 2 and 3.

Each of mounting members 25m and 25n has a hole or other feature formed therein to facilitate mounting of the housing on a portion of the vehicle using suitable mounting hardware 61 (for example, a fastener such as a nut, screw, or bolt). In the embodiment shown in FIGS. 1 and 3, the central axes of holes 25m-1 in mounting member 25m and 25n-1 in mounting member 25n are aligned along a common axis L (FIG. 4). In particular embodiments, the total length L4 of the extrusion (in the direction of extrusion) from which the housing is formed is in the range 6 inches to 60 inches. However, it is seen that, since housing is made using an extrusion process, the extrusion forming the housing may easily be made to any desired length L4 according to the needs of a particular application.

Body portion 25a also includes an opening 25p structured to permit insertion of a stud, bolt or other retention feature 60 therethrough. The retention feature may be, for example, a fastener such as a nut or screw. Retention feature 60 is attached to inflator 5 and passes through the body portion 25a when the airbag module is affixed to the vehicle, to attach the inflator to the vehicle. In addition, because body portion 25a is positioned between the inflator 5 and the vehicle, the retention feature also aids in securing the body portion 25a to the vehicle. Although a single opening for a single retention feature is shown in FIG. 4, multiple spaced-apart openings may be formed in the body portion to permit the attachment of the inflator and housing to the vehicle using multiple associated retention features.

In the particular embodiment shown in FIG. 4, opening 25p is positioned so as to be spaced apart a distance D from axis L along which the mounting member openings 25m-1 and 25n-1 are formed. In a particular embodiment, opening 25p is positioned along an axis S that lies midway between the central axes P and R of openings 25m-1 and 25n-1. Other arrangements of retention members attaching the housing and/or inflator to the vehicle may also be used, depending on the requirements of a particular application.

Referring to FIG. 3, in another aspect of the embodiments described herein, an airbag module 1 includes an embodiment of housing 25 described herein, and inflator 5 and airbag 6 secured within the housing. A strap 70 may optionally be provided to aid in securing the airbag in a folded position within the housing. Ends of strap 70 may be secured to mounting hardware positioned on mounting members 25m and 25n, for example. The strap 70 may then extend into the housing interior to help compress and secure the airbag in a pre-deployment configuration.

FIG. 6 is a cross-sectional side view of the airbag module shown in FIG. 1 during deployment of the airbag. One application of an airbag module structured and positioned in the vehicle as shown, is as a knee airbag. During deployment of the airbag 6, the first portion 2 and the second portion 3 flexibly fold outwardly so as to form ramps 2', 3' (representing first and second portions 2 and 3 in a deployed condition of the module). The ramps 2', 3' are structured to guide the airbag 6 into the occupant compartment of the vehicle. During the initial deployment stage of the airbag 6, the airbag exerts forces against the first and second portions 2 and 3, causing both the first portion 2 and the second portion 3 to follow the trajectory as shown by the first arrow 27 and the second arrow 28. The first portion 2 bends and follows the trajectory as shown by the first arrow 27. The second portion 3 bends and follows the trajectory as shown by the second arrow 28 until it contacts and bears against a lower surface of panel 4. As the first portion 2 and the second portion 3 bend, the deploying airbag 6 follows the path created by the ramps 2' and 3'. Also, with one or more of ramps 2' and 3' positioned between the vehicle and the airbag during initial deployment, the ramps may act to prevent snagging of the airbag on portions of the vehicle interior during deployment.

According to one embodiment, when the airbag 6 is fully deployed, the first portion after deployment 2' and the second portion after deployment 3' are positioned adjacent to the airbag 6. The first portion after deployment 2' may be positioned between the instrument panel 4 and the airbag 6. The second portion after deployment 3' may be sandwiched between the instrument panel 4 and the airbag 6.

FIG. 9 is a schematic view of a portion of a vehicle occupant protection system 900 installed in a host vehicle 880 and incorporating an airbag module 1 in accordance with an embodiment described herein. In this embodiment, the airbag module 1 is shown mounted on a lower portion of an instrument panel 4 of the vehicle. However, the module 1 may be mounted in any suitable location. In this embodiment of the vehicle occupant protection system 900, a vehicle mounted collision sensor 810 detects contact between the host vehicle 880 and another vehicle (not shown). Responsive to this detected contact, an activation signal is sent to the airbag module 1, resulting in activation of the module gas generator or otherwise releasing pressurized gases into the interior of the airbag 6 (not shown). As the inflator 5 provides gas to the airbag 6, the airbag 6 inflates and deploys. As the airbag 6 is inflated and deploys, the first housing portion 2 disconnects from the second housing portion 3, thereby opening the housing. The airbag 6 then expands to enter the occupant compartment of the vehicle, thereby protecting the occupant during the vehicle collision. As the airbag deploys, ramps 2' and 3' form guide surfaces which direct portions of the airbag in one or more preferred directions during the initial airbag deployment.

Figure 12:
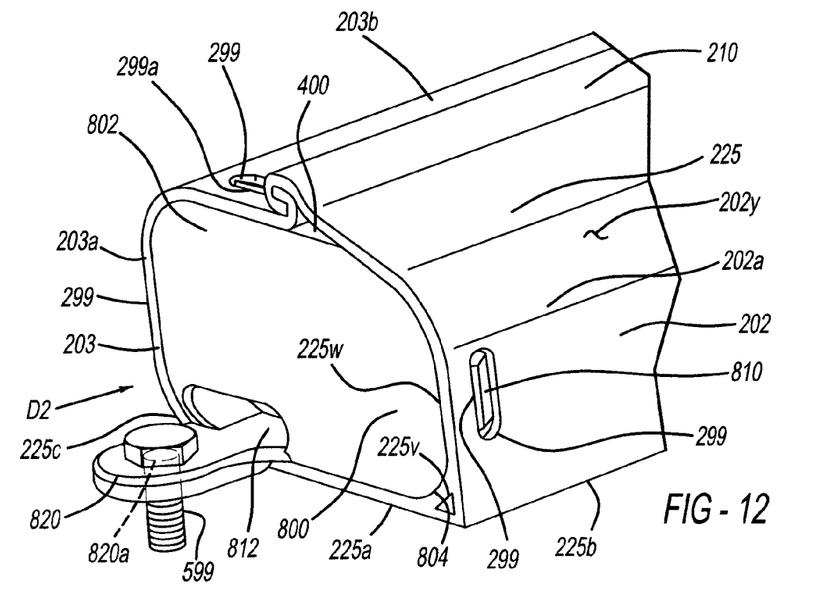
FIG. 12 is a perspective view of an end portion of an embodiment of the airbag housing and an associated airbag module.
Figure 13:
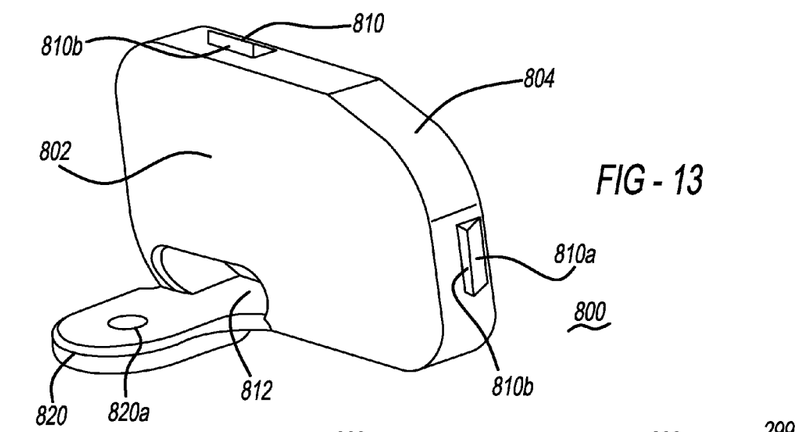
FIG. 13 is a perspective view of an endcap securable to an end of the module housing shown in FIG. 12.
Figure 13A:
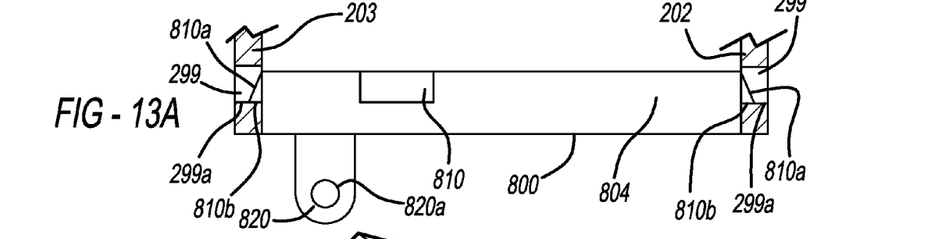
FIG. 13A is a cross-sectional edge view of the endcap shown in FIG. 13 inserted into an end of a housing.
Figure 14:
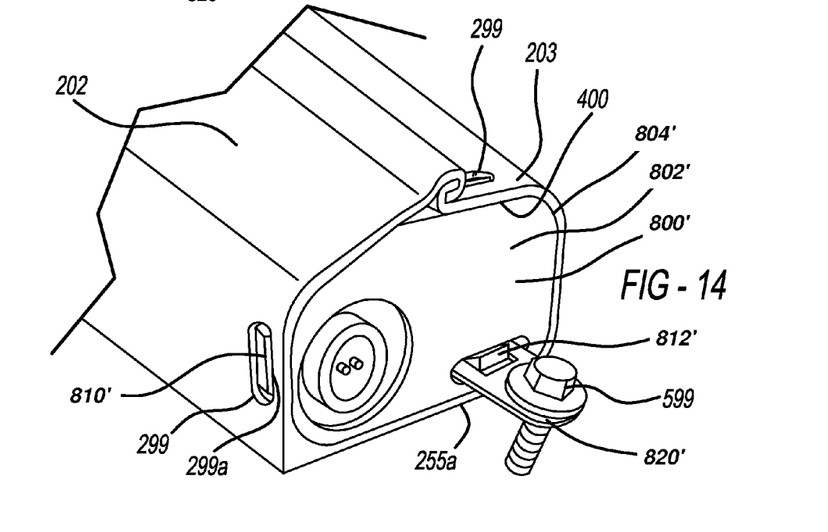
FIG. 14 is a perspective view of an end portion of another embodiment of an airbag housing and module.

Referring now to FIGS. 12-14, in other embodiments and unless otherwise described, a housing 225 has the structural and operational characteristics previously described with regard to FIG. 1. Housing 225 has a body portion 225a and a cover (generally designated 210) extruded integrally with the body portion 225a so as to form a single monolithic unit.

Cover 210 includes a first portion 202 extending from a first edge 225b of the body portion, and a second portion 203 extending from a second edge 225c of the body portion opposite the first edge, as in the previously described embodiments. Either of first portion 202 and second portion 203 may extend along an entire respective edge of body portion 225a, or along only a portion of the respective edge, as previously described. The embodiments shown in FIGS. 12-14 may be mounted to a vehicle (for example, along body portion 225a) as previously described.

In the embodiments described herein, surfaces of the extrusion 225 facing or defining an interior of the housing when the extrusion is in a folded and/or closed condition, or residing within an enclosure defined by the extrusion when the extrusion is in a folded and/or closed condition, are considered to be interior surfaces of the housing. Similarly, surfaces located on a side of a wall of the extrusion opposite the side on which interior surfaces are located, or facing away from the extrusion when the extrusion is in a folded and/or closed condition, are considered to be exterior surfaces of the housing. For example, in the embodiment shown in FIG. 12, the surface of first portion 202 labeled 202w (which abuts and extends along the peripheral edge 804 of an endcap 800 (described below)) is considered to be an interior surface The surface labeled 202y which faces away from the extrusion is considered to be an exterior surface.

In the embodiments shown in FIGS. 12-14, at least one opening 299 extends through the thickness of each of a first one and a second one of the first portion 202, the second portion 203, and the body portion 225a. In a particular embodiment, at least one opening 299 is formed in each of the first portion 202, the second portion 203, and the body portion 225a, for the purposes described herein. Opening(s) 299 are structured to receive therein a complementary retention tab 810 formed along a peripheral edge of an endcap 800 (as described in greater detail below) when the endcap is secured to an end of the housing 225. At least one edge of each opening 299 defines a shoulder or bearing surface 299a structured for engaging and abutting an associated retention surface 810b formed on a corresponding one of retention tabs 810 when the tab is inserted into one of openings 299.

In particular embodiments, the housing extrusion 225 is formed with one or more relatively sharp exterior corner(s) extending along the length thereof, parallel to an axis of extrusion from the extrusion die. For example, in the embodiment shown in FIGS. 12 and 13, the housing extrusion 225 is formed with a single relatively sharp exterior edge or corner 225b extending along the length of the extrusion. Relatively sharp corner(s) such as 225b add rigidity to the parts of first portion 202 and body portion 225a adjacent the corner(s). This may aid in attaching the body portion 225a to the vehicle, and may also facilitate insertion of the endcap 800 into the end of the folded extrusion. If desired, a hollow core 225v may be extruded into the portion of the extrusion adjacent the corner(s) 225w to aid in maintaining a uniform wall thickness in the various portions of the extrusion. A relatively sharp corner such as 225b formed along the extrusion may have a minimum radius of 5 millimeters.

Referring to FIG. 13, endcap 800 is a part formed separately from housing 225 and may be formed from a metallic material, a polymer, or any other suitable material or materials. Endcap 800 has a body 802 and a peripheral edge 804 defining an extent of the body 802. In this embodiment, the endcap 800 is structured and dimensioned to fit within a cavity 400 defined by an end of the housing in the closed condition (i.e., within the cavity 400 defined by the interior surfaces of body portion 225a, first portion 202 and second portion 203) when the extrusion is in a folded condition and the free ends of first and second portions 202 and 203 are connected by a suitable disengageable connecting means, as previously described. The endcap 800 is structured and dimensioned so that the endcap peripheral edge 804 will abut portions of these interior surfaces in a sliding fit or an interference fit as shown in FIG. 12 during insertion of the endcap into the end of the folded housing, to aid in sealing the end of the housing.

Retention tabs 810 are formed at locations along endcap edge 804 such that each retention tab extends into and engages a corresponding one of openings 299 formed in housing 225 as previously described. Each tab 810 has a lead-in surface 810a and a retention surface 810b.

Although only one end of housing 225 is shown in FIG. 12, it will be understood that the following description applies to both longitudinal ends of the housing and airbag module embodiment shown. However, if desired, an endcap 804 and the housing features provided for securing the endcap to a housing end may be provided only at a single end of the housing.

In the particular embodiment shown in FIGS. 12 and 13, at each end of the housing, two openings 299 are formed on second housing portion 203. One opening is formed along a section of the second portion which forms a side portion 203a of the housing when folded, and is not visible in the drawing. Another opening 299 is formed along a section of the second portion which forms part of a top portion 203b of the housing when folded. As seen in FIG. 12, this section is adjacent the free edge of the second portion 203 and resides opposite housing body portion 225a when folded over. In addition, another opening 299 is formed in first portion 202 along a section of the second portion which forms a side portion 202a of the housing when folded. It is seen from FIG. 12 that side portion 202a resides opposite side portion 203a. The retention tabs 810 are formed along the edges of the endcaps 800 in positions corresponding to the tab-receiving openings at each end of the housing. Thus, in the embodiment shown, retention tabs 810 engage the housing along opposite sides thereof to aid in retaining the endcap 800 on the housing.

In another embodiment (not shown), the retention tab 810 and corresponding housing opening 299 residing opposite housing body portion 225a are omitted. Alternatively, openings 299 may be arranged along housing first portion 202, second portion 203 and body portion 225a according any of a variety of alternative schemes.

After the housing portions 202 and 203 are folded and secured as previously described to provide a closed condition of the housing, an endcap 800 is inserted into each end of the housing in a direction D2 toward the housing interior, with each retention tab 810 being aligned with a respective one of openings 299. Lead-in surfaces 810a engage the interior surfaces of the housing first portion 202, second portion 203 and/or body portion 225a, sliding along these interior surfaces, forcing the engaged housing portion to deflect resiliently outwardly until the retention surface 810b on each tab 810 passes a respective shoulder 299a in one of openings 299. The deflected housing portions then snap back behind the retention tabs 810. Then, forces exerted on the endcap 800 (for example, by a folded and compressed inflatable device positioned in the housing) in a direction opposite the endcap insertion direction D2 will cause the tab retention surfaces 810b to abut respective ones of shoulders 299a, thereby resisting withdrawal of the endcaps from the housing ends. Thus, in the manner described above, the endcap snaps easily into an end of the housing. When applied to the opposite longitudinal housing ends, endcaps 800 aid in preventing the entry of foreign material into the housing prior to airbag deployment.

Figure 15:
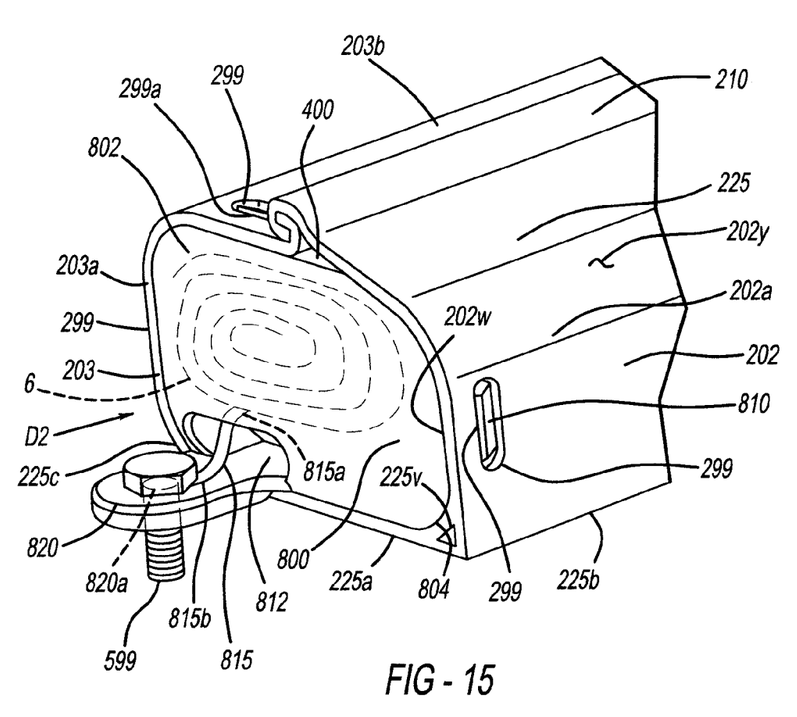
FIG. 15 is a perspective view of an end portion of another embodiment of an airbag housing and module.

Referring to FIGS. 12 and 13, in particular embodiments, an opening 812 extends through endcap body 802. Opening 812 is structured to permit a tether to 815 to extend from an interior of the closed housing to the exterior of the housing. A first end of 815a of the tether 815 may be attached to the airbag 6 or inflatable device to aid in controlling the shape of the bag during deployment, in a manner known in the art. The endcap may be structured such that the edges or perimeter of the tether opening 812 are continuous or completely closed as shown in FIG. 13, with no gaps through which the tether might exit the boundary of the opening The tether extends through the opening 812 to an exterior of the housing. A second end 815b of the tether is secured to a fixed portion of the vehicle, to anchor the tether second end 816b. In one embodiment, the tether second end is coupled to the vehicle via a bolt or other hardware (such as screw 599 shown in FIGS. 12, 14, and 15, or fastener 61 shown in FIG. 3) used to attach the module to the vehicle. In another embodiment, the tether second end is secured to a portion of the vehicle spaced apart from the module.

Referring again to FIGS. 12 and 13, in a particular embodiment, a flange 820 is formed integrally with endcap body 802 so as to extend in a direction away from the housing 225. Flange 820 is structured to provide additional means for mounting or securing the housing to a portion of a vehicle or other structure. Flange 820 may have an opening 820a formed therein to accommodate a screw 599 or other fastening means.

FIG. 14 shows another embodiment 800' of the endcap similar to that shown in FIGS. 12 and 13, but without the integrally formed flange 820. In the embodiment shown in FIG. 14, a flange 820' is formed separately from the endcap and is attached to the housing extrusion and/or the endcap using any suitable method.

In another embodiment (not shown), the endcap has a tether opening 812 as previously described, but no an attachment flange (such as flange 820). This embodiment of the endcap may be mounted to a housing embodiment having integrally-molded attachment features (such as mounting ears 25m and 25n shown in FIG. 4).

During deployment of the airbag, the connected portions of housing portions 202 and 203 become separated, as previously described. As the housing portions spread apart, the endcap retention tabs 810 become disengaged from the housing, thereby releasing the endcaps 800 from the housing. In embodiments where the endcap is not otherwise attached to the vehicle, it is desirable to control motion of the endcaps during and after module deployment. For this purpose, an endcap positioning control means may be provided. The embodiments of the positioning control means are designed to maintain the endcaps 800 in contact with the housing 225 after airbag deployment, or to otherwise control the motion and/or position of the endcaps after they become disengaged from the housing during airbag deployment.

In particular embodiments of the endcap positioning control means, the tether is used to control motion of the endcap. In these embodiments, the end of the tether not secured to the airbag may be secured to the mounting attaching the endcap to the vehicle, to the mounting attaching the housing mounting ears to the vehicle, or to a portion of the vehicle spaced apart from the airbag module as previously described. In this case, because the tether passes through the opening 812, movement of the endcap after disengaging from the housing is restricted to a path along the length of the tether.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A housing for an airbag module, the housing comprising:
    an extrusion incorporating a body portion and a cover extruded integrally with the body portion so as to form a single monolithic unit;
    at least one endcap formed separately from the extrusion and operatively coupled to an end of the extrusion so as to seal the end, said at least one endcap disengaged from said extrusion upon activation of the airbag module; and
    an endcap positioning control means operatively coupled to the housing so as to restrict a movement of the at least one endcap after activation of the airbag module.

2. The housing of claim 1 wherein the cover comprises a flexible first portion connected to a first edge of the body portion, and a flexible second portion connected to a second edge of the body portion opposite the first edge.

3. The housing of claim 2 further comprising disengageable connecting means structured to connect the first portion and the second portion along a seam formed therebetween.

4. The housing of claim 3 wherein the disengageable connecting means comprises a hook and loop fastening system.

5. The housing of claim 3 wherein the disengageable connecting means comprises an adhesive material.

6. The housing of claim 3 wherein the disengageable connecting means comprises a clasping mechanism extruded integrally with the remainder of the extrusion, the clasping means being formed along an edge of at least one of the first portion and the second portion, the clasping mechanism being structured to engage a portion of the other one of the first portion and the second portion to form a connection therebetween.

7. The housing of claim 1 wherein the extrusion is formed with a relatively sharp exterior corner extending along a length thereof, in a direction parallel to an axis of extrusion.

8. The housing of claim 1 further comprising a first opening and a second opening formed in at least one end of the extrusion, and wherein a first portion of the at least one endcap extends into the first opening and a second portion of the at least one endcap extends into the second opening, to secure the at least one endcap to the extrusion.

9. The housing of claim 1 wherein the endcap includes a mounting flange formed integrally with a body portion of the endcap and extending from the body in a direction away from the extrusion.

10. The housing of claim 1 wherein the extrusion is formed from Adflex KSO21P Polyolefin.

11. An airbag module including a housing in accordance with claim 1.

12. A vehicle occupant protection system including an airbag module in accordance with claim 11.

13. A vehicle including an airbag module in accordance with claim 11.

14. The airbag module of claim 1 wherein an opening is formed in the endcap, and wherein the endcap positioning control means comprises a tether having a first end operatively coupled to an interior of the housing, the tether extending from the housing interior through the endcap opening to an exterior of the housing.

* * * * *